United States Patent [19]

Scarborough et al.

[11] Patent Number: 5,433,011
[45] Date of Patent: Jul. 18, 1995

[54] COMBINATION INTERLOCKING SEGMENTED LEVEL

[76] Inventors: Dane Scarborough; Jesse Vint, both of PO Box 3351, Hailey, Id. 83333

[21] Appl. No.: 52,890

[22] Filed: Apr. 27, 1993

[51] Int. Cl.$^6$ .............................................. G01C 9/00
[52] U.S. Cl. ........................................ 33/376; 33/374; 33/478
[58] Field of Search ................ 33/376, 374, 390, 451, 33/474, 478, 296, 829; 220/692, 693, 682, 4.27

[56] References Cited

U.S. PATENT DOCUMENTS

| | | | |
|---|---|---|---|
| 636,191 | 10/1899 | Wright | 33/376 X |
| 686,360 | 11/1901 | Smiddy . | |
| 747,850 | 12/1903 | Bihlman . | |
| 945,275 | 1/1910 | Heistad . | |
| 1,130,610 | 3/1915 | Kane | 33/376 X |
| 1,182,730 | 5/1916 | Anderson et al. | 33/376 |
| 1,403,676 | 1/1922 | Eltag et al. . | |
| 1,413,056 | 4/1922 | Parrish et al. . | |
| 1,430,904 | 10/1922 | Hunter . | |
| 1,655,766 | 1/1928 | Hildebrant | 33/376 X |
| 2,383,166 | 8/1945 | Seiwell | 33/376 X |
| 2,419,451 | 4/1947 | Keller . | |
| 2,551,524 | 5/1951 | Bullivant . | |
| 2,879,606 | 3/1959 | Olivere . | |
| 3,104,477 | 9/1963 | Edwill . | |
| 3,161,964 | 12/1964 | Myles . | |
| 3,243,888 | 4/1966 | Redding . | |
| 3,811,197 | 5/1974 | Moore et al. | 33/374 |
| 4,130,943 | 12/1978 | Talbot | 33/374 |
| 4,336,655 | 6/1982 | Thingstad | 33/161 |
| 4,590,682 | 5/1986 | Koch | 33/383 |
| 4,607,437 | 8/1986 | McSorley, Sr. et al. | 33/374 |
| 4,862,595 | 9/1989 | Drumright | 33/374 |
| 4,928,395 | 5/1990 | Good | 33/374 |
| 5,131,164 | 7/1992 | Miller | 33/451 X |

Primary Examiner—Alvin Wirthlin
Attorney, Agent, or Firm—Macro-Search Corp.

[57] ABSTRACT

A collapsible, compound level apparatus is provided and includes a first linear leveling section and a second linear leveling section. Each section includes at least one flat surface for contact with a work surface, and first and second bubble levels arranged for indicating level and plumb, respectively, of the work surface. The first section provides at one end thereof an engagement tongue that engages an engagement groove of one end of the second section, thereby providing colinear interconnection of the leveling sections and forming an integral linear structure for positioning the flat surfaces of each section in mutually coplanar contiguous alignment. The engagement tongue has an oblique surface and an end stop surface for contacting a mating oblique surface and a mating end stop surface of the engagement groove. The oblique surfaces and the mating end stop surfaces of each section form an acute angle. The second section includes a lateral force producing pressure screw for applying a lateral force on the tongue such that the oblique surfaces and the end stop surfaces are caused to move into mutual contact, thus achieving alignment of the flat surfaces of both the first and second sections. Additional linear leveling sections, L-shaped sections, and T-shaped sections are included.

4 Claims, 4 Drawing Sheets

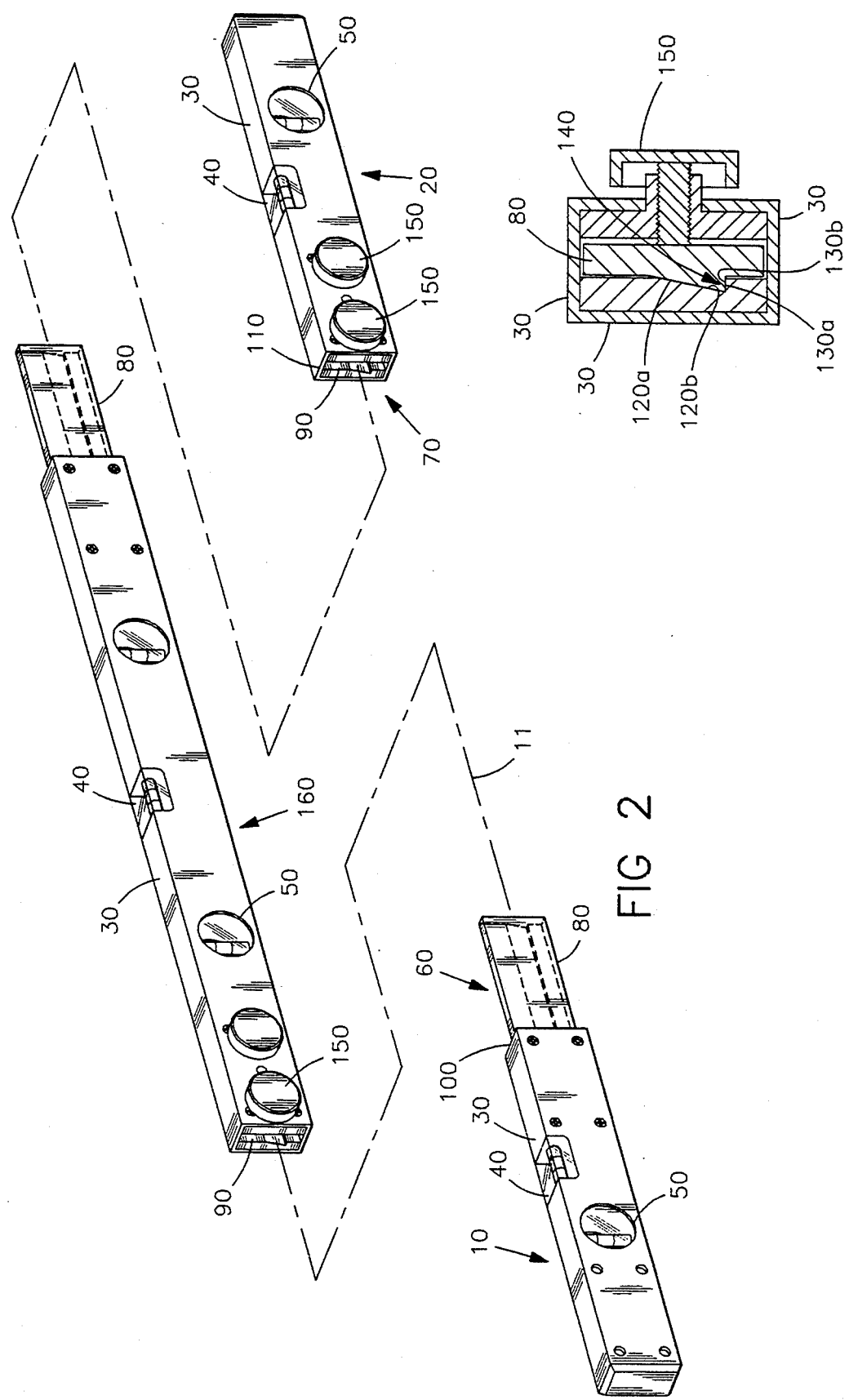

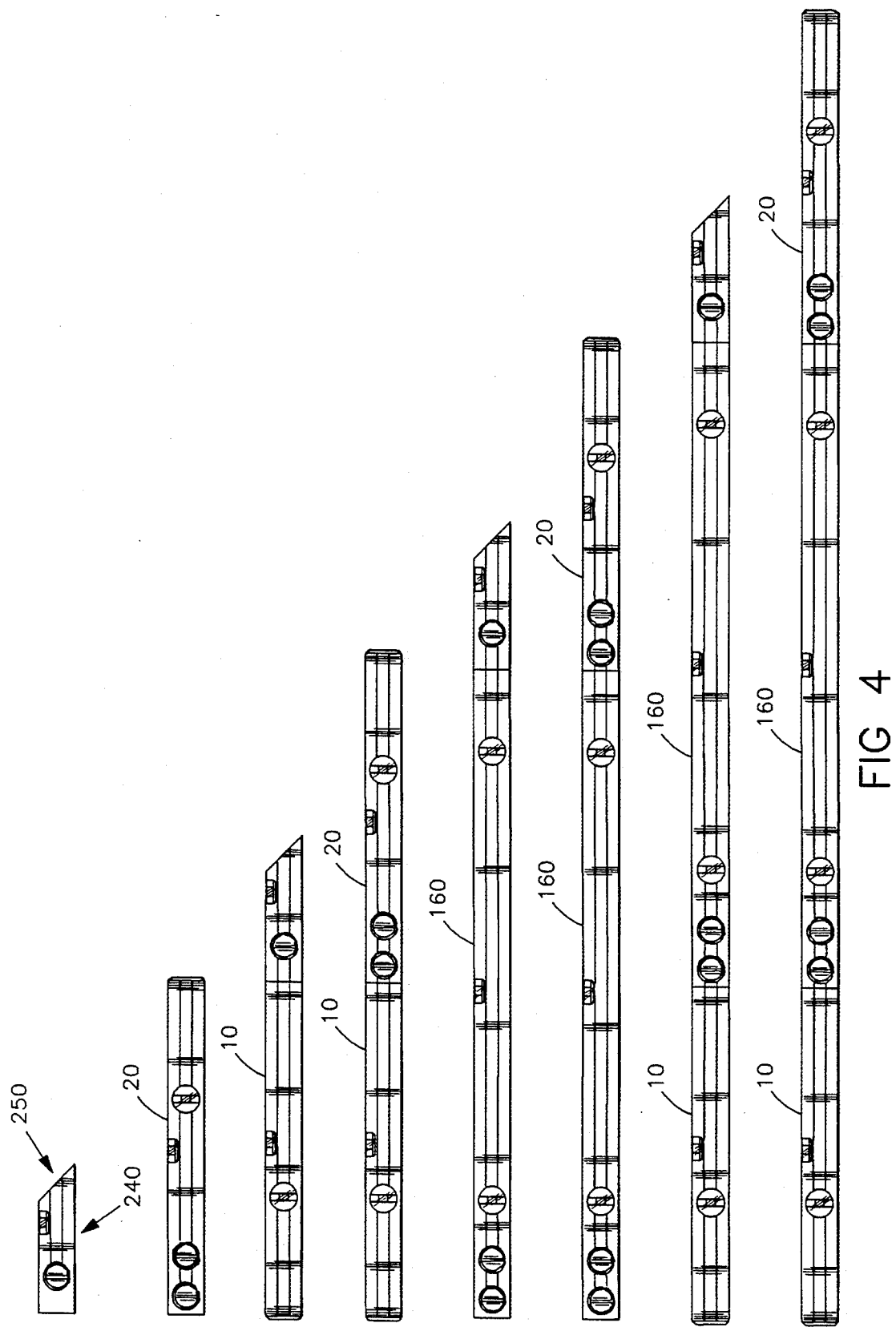

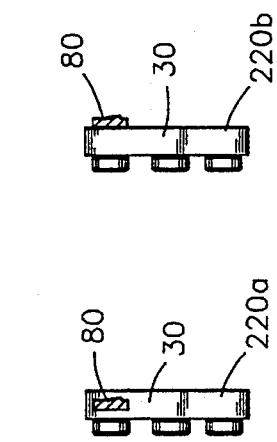
FIG 5
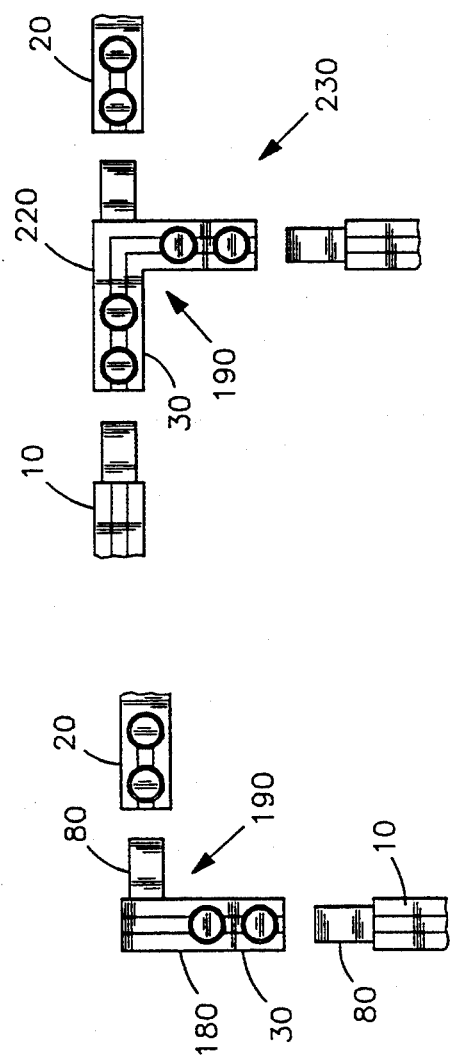
FIG 6
FIG 7A FIG 7B
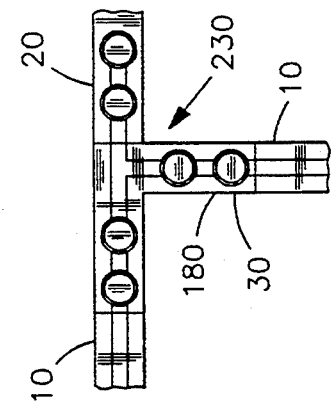
FIG 8
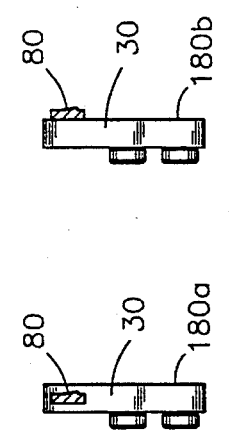
FIG 9A FIG 9B
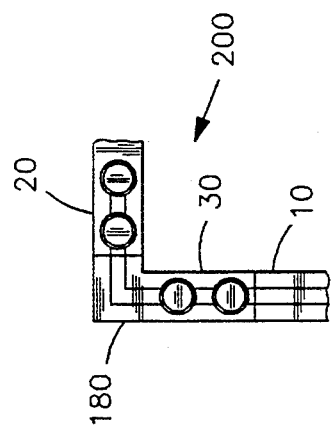
FIG 10

COMBINATION INTERLOCKING SEGMENTED LEVEL

FIELD OF THE INVENTION

This invention relates generally to carpenters' tools, and, more particularly, is directed towards a collapsible, compound level comprised of various sections.

BACKGROUND OF THE INVENTION

Carpenters, during the normal course of their work, face a variety of different construction tasks. Many of these tasks require different lengths and sizes of leveling and squaring tools. Understandably, various carpenters tools have been developed that serve to reduce the number of such tools required, and thereby make it easier for the carpenter to transport and use such tools. For example, extensible levels exist in the prior art that are useful for tasks requiring either a short or long level. Such extensible level prior art is found, for instance, in U.S. Pat. 747,850, issued to Bihlman on Dec. 22, 1903; U.S. Pat. 1,403,676 to Eltag et al. on Jan. 17, 1922; U.S. Pat. 1,413,056 to Parrish on Apr. 18, 1922; U.S. Pat. 2,879,606 to Olivere on Mar. 31, 1959; and U.S. Pat. 4,607,437 to McSorley, Sr. et al. on Aug. 26, 1986. Such prior art devices, however, are not well suited for working with surfaces that are non-linear, such as corners and other 90° and 45° angled surfaces. Such devices cannot function, for example, as T-squares or a right-angle rule. Further, such prior art devices are considerably weaker in their extended configuration than in their compact configuration. As a result, such devices are more prone to damage in their extended positions, and it is well known that tools at construction cites often experience many harsh, potentially damaging forces. Moreover, relatively little force is required to bend the various sections of such extended devices out of linear alignment, resulting in erroneous measurements and readings. Further, such devices are either limited to a maximum extension length or cannot provide an extended contiguous working surface.

Clearly, then, there is a need for a carpenter's tool that is useful for leveling across short and arbitrarily long distances. Such a needed device would be durable, relatively easy to manufacture, and remain straight over large distances. The linearity of such a device, moreover, could be verified at multiple points along its length. Such a needed device, further, could be quickly adapted for use as a T-square, a right-angle rule, or other measuring and leveling tools. Still further, such a needed device would be collapsible and, when collapsed, would fit into a standard tool box. Still further, such a needed device would be easy to use and adapt to various configurations. The present invention fulfills these needs and provides further related advantages.

SUMMARY OF THE INVENTION

The present invention is a compound level comprising a first straight, linear leveling section and a second straight, linear leveling section. Each section includes at least one flat surface, but preferrably not less than three flat surfaces, for contact with a work surface, a first bubble level and a second bubble level arranged for indicating level and plumb, respectively, of the work surface. The first section provides an engagement tongue that engages an engagement groove of the second section, thereby providing colinear interconnection of the leveling sections and forming an integral linear structure for positioning the flat surfaces of each section in mutually coplanar contiguous alignment. The engagement tongue has an oblique surface and an end stop surface for contacting a mating oblique surface and a mating end stop surface of the engagement groove. The second section includes a lateral force producing pressure screw for applying a lateral force on the tongue such that the oblique surfaces and the end stop surfaces are caused to move into mutual contact, thus achieving alignment of the flat surfaces of both the first and second sections.

Additional leveling sections are included, each having at least one flat surface for contacting with the work surface, and the first and second bubble levels arranged for indicating level and plumb, respectively, of the work surface. Each additional leveling section further includes the engagement tongue at one end and the engagement groove at the opposing end. An additional L-shaped section may also be included that forms a true right angle. The L-shaped section includes both the engagement tongue at one end and the engagement groove at the opposing end. As such, the L-shaped section may be engaged with any of the other leveling sections for forming a right angle structure. An additional T-shaped section may also be included that forms a pair of true right angles. The T-shaped section includes either the engagement tongue or the engagement groove at each of the three ends of the T-shaped section. As such, the T-shaped section may be engaged with any of the other leveling sections for forming an integral T-shaped structure.

The present invention is a carpenter's tool that is useful for leveling across short and arbitrarily long distances, and provides three working surfaces in the preferred embodiment. The present device is durable, relatively easy to manufacture, and remains true over large distances. Its linearity, in fact, can be verified at multiple points along its length. Further, the present device can be quickly adapted for use as a T-square, a right-angle rule, or other measuring and leveling tools. When collapsed, the present level may be adapted to fit into a standard tool box. The present device is easy to use and can be adapted to various configurations of various lengths quickly. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 2 is an exploded perspective illustration of the invention, illustrating the first section, the additional leveling section, the second section, and a first and a second engagement means of each section;

FIG. 3 is a cross-sectional view of the invention, taken generally along lines 3—3 of FIG. I, and further illustrating the first and second engagement means of the invention;

FIG. 4 is a front elevational view of various configurations of the various sections of the invention;

FIG. 5 is an exploded top plan view of the invention, illustrating a configuration of the invention that includes an L-shaped section;

FIG. 6 is an exploded top plan view of the invention, illustrating a configuration of the invention that includes a T-shaped section;

FIG. 7A is a left-side elevational view of the L-shaped section of the invention showing tongue 80 in a central position;

FIG. 7B is a left-side elevational view of the L-shaped section of the invention showing tongue 80 in offset position;

FIG. 8 is a top plan view of the invention, illustrating a configuration of the invention that includes a T-shaped section;

FIG. 9A is a left-side elevational view of the T-shaped section of the invention showing tongue 80 in a central position;

FIG. 9B is a left-side elevational view of the T-shaped section of the invention showing tongue 80 in an offset position;

FIG. 10 is a top plan view of the invention, illustrating a configuration of the invention that includes an L-shaped section.

DETAILED DESCRIPTION OF THE PREFERRED EMBODIMENT

Figure 1:
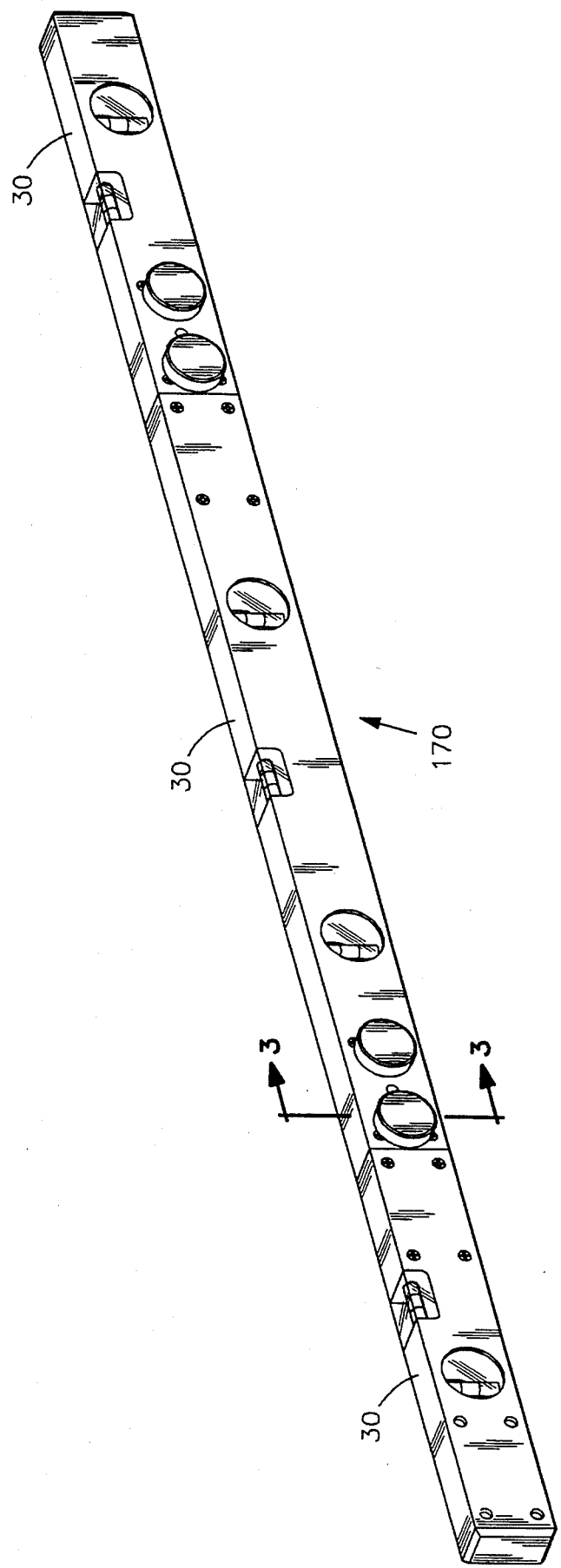
FIG. 1 is a perspective illustration of the invention, illustrating a multisection level formed by joining a first leveling section, an additional leveling section, and a second leveling section engaged, such that flat surfaces of each section are in mutually coplanar contiguous alignment.

FIGS. 1 and 2 show a compound combination level device comprising a first linear leveling section 10 and a second linear leveling section 20. Each section 10,20 includes at least one flat surface 30, but preferrably not less than three flat surfaces 30, for contact with a work surface (not shown). Further, each section 10,20 includes a first orientation sensing means 40 and a second orientation sensing means 50 arranged for indicating level and plumb respectively of the work surface. Each section 10, 20 further includes a longitudinal axis II extending in parallel with the flat surfaces 30, (FIG. 2), and provides opposing ends defining the longitudinal extent of the section.

The first section 10 provides a first engagement means 60, and the second section 20 provides a second engagement means 70. First and second engagement means 60,70 provide colinear interconnection of the leveling sections 10,20, thereby forming an integral linear structure 170 for positioning the flat surfaces 30 of each section 10,20 in mutually coplanar contiguous alignment. Preferably, the first engagement means 60 includes a tongue 80, and the second engagement means 70 includes a groove 90 (FIG. 2). The tongue 80 extends from an end 100 of the first section 10, and the groove 90 is incorporated in an end 110 of the second section 20. The tongue 80 has a mating oblique surface 120a and a mating end stop surface 130a for contacting a mating oblique surface 120b and a mating end stop surface 130b of the groove 90 (FIG. 3). The oblique surface 120a and the mating end stop surface 130a form an acute angle 140, as do the oblique surface 120b and the mating end stop surface 130b.

The second engagement means 70 includes a lateral force producing means 150 for applying a lateral force on the tongue 80 such that the oblique surfaces 120a,b and the end stop surfaces 130a,b are caused to move into mutual contact, thereby achieving alignment of the flat surfaces 30 of both the first and second sections 10,20. Such a lateral force producing means 150 may be a pressure screw arrangement, as illustrated in FIG. 3, or other lateral force producing means 150 such as spring loaded piston arrangements, cam and lever arrangements, and the like. Clearly anyone skilled in the art could readily devise various methods of producing a lateral force against the tongue 80. In operation, the user engages the tongue 80 of the first section 10 with the groove 90 of the second section 20 and then tightens the lateral force producing means 150 until relative movement of the tongue 80 with the groove 90 is prohibited. The lateral force producing means 150 forces the oblique surfaces 120a,b together which causes the oblique surface 120a of the tongue 80 to slide relative to the oblique surface 120b of the groove 90 until the end stop surface 130a of the tongue 80 is forced firmly against the end stop surface 130b of the groove 90.

At least one additional leveling sections 160 may be included, each additional leveling section 160 having the flat surface 30 for contacting with the work surface, and the first and second orientation sensing means 40,50 arranged for indicating level and plumb respectively of the work surface, and the first engagement means 60 at one end, and the second engagement means 70 at the opposing end. As such, the additional leveling sections 160 may be engaged with any of the other leveling sections 10,20,160 for forming a multisection level 170 (FIGS. 1 and 4). Each section 160 is aligned with the other sections 10,20,160 so that all of the flat surfaces 30 of the sections 10,20,160 are in mutual coplanar contiguous alignment.

At least one additional L-shaped section 180 may be included that forms a right angle 190 to close tolerance. The L-shaped section 180 includes both a first engagement means 60 at one end, and the second engagement means 70 at the opposing end. As such, the L-shaped section 180 may be engaged with any of the other leveling sections 10,20,160 for forming a right angle structure 200 (FIG. 10). Clearly, the L-shaped section 180 may also include the first or second orientation sensing means 30,40 arranged for indicating level and plumb, respectively, of the work surface. Further, the L-shaped section 180 could easily be configured as a left-handed embodiment, as illustrated in FIG. 5, or a right-handed embodiment, not shown but understood to be the mirror image of FIG. 5.

The L-shaped section 180 may be formed as an L-shaped section 180a (FIG. 9A), such that when engaged with other sections 10,20,160 at least two of the flat surfaces 30 of the sections 10,20,160,180a are in mutual coplanar contiguous alignment. In another embodiment of the invention, the L-shaped section 180 may be formed as an L-shaped section 180b (FIG. 9B), such that when engaged with other sections 10,20,160, at least one of the flat surfaces 30 of the sections 10,20,160 is in mutually coplanar alignment, but not in mutual contiguous edge-wise alignment, with at least one of the corresponding flat surfaces 30 of section 180b. As such, the right angle structure 200 may be used to contact adjacent perpendicular faces of a workpiece simultaneously (not shown).

At least one additional T-shaped section 220 may be included that forms a pair of true right angles 190 to close tolerance. The T-shaped section 220 includes either the first engagement means 60 at one end and the second engagement means 70 at each of the other two ends thereof, or the second engagement means 70 at one end and the first engagement means 60 at each of the other two ends thereof. As such, the T-shaped section 220 may be engaged with any of the other leveling sections 10,20,160 for forming an integral T-shaped structure 230 (FIG. 6). The T-shaped section 220 may be aligned with the other sections 10,20,160 so that at least four of the flat surfaces 30 of the sections 10,20,160,220 are in mutual coplanar contiguous alignment. Clearly, the T-shaped section 230 may also include the first or second orientation sensing means 40,50 arranged for indicating level and plumb, respectively, of the work surface.

The T-shaped section 220 may be formed as an T-shaped section 220a (FIG. 7A), such that when engaged with other sections 10,20,160, at least four of the flat surfaces 30 of the sections 10,20,160,220a are in mutual coplanar contiguous alignment. In another embodiment of the invention, the T-shaped section 220 may be formed as a T-shaped section 220b (FIG. 7B) such that when engaged with other sections 10,20,160, at least one of the flat surfaces 30 of the sections 10,20,160 is in mutually coplanar alignment, but not in mutual edgewise contiguous alignment, with a corresponding flat surface 30 of section 220b.

Clearly, other types of sections with the first engagement means 60 or the second engagement means 70 may be included. For example, FIG. 4 illustrates an additional section 240 that has the second engagement means 70 on one end and an end surface on the opposing end 250 that is inclined at an angle of 45° with respect to the flat surfaces 30 of the section 240. Such a section 240 is useful in various applications where a 45° angle is necessary. Clearly angles other than 45° could be incorporated in the opposing end 250 of such a section 240.

Each section 10,20,160,180,220,240 is preferably formed from a strong, rigid material, such as hardened steel or aluminum. Clearly, however, any suitably strong, rigid material may be used. Each section 10,20,160 may be partially formed by an extrusion process, as can the tongue 80 of each second engagement means 70. Likewise, however, each section 10,20,160,180,220,240 may also be metal casted. As illustrated in FIGS. 2 and 3, each engagement means 60,70 may be fixed to each section 10,20,160,180,220,240 with a plurality of set screws. The set screw (not shown) takes the place of the pressure screw arrangement 150 for applications where disassembly is discouraged or not desirable. Further, an end cap may replace the engagement means 60,70 on any end of any section 10,20,160,180,220,240, if desired (FIGS. 1 and 2). Further, first and second orientation sensing means 40,50 are preferably conventional bubble levels comprising a fluid filled linear column with an air bubble, or the like. However, other orientation sensing means may be used, such as electronic orientation sensing means, or the like.

While the invention has been described with reference to a preferred embodiment, it is to be clearly understood by those skilled in the art that the invention is not limited thereto. For example, each section 10,20,160,180,220,240 may be manufactured without the first or second orientation means 40,50, thus providing an expandable straight edge device. Thus, the scope of the invention is to be interpreted only in conjunction with the appended claims.

What is claimed is:

1. A compound level for sensing orientation of a work surface comprising at least a first and a second leveling section, each said section providing first and second ends and including a longitudinal axis and at least one external flat surface, parallel to the longitudinal axis, for contact with the work surface, and at least one orientation sensing means positioned for indicating orientation of the work surface when the external flat surface is brought into contact therewith, the first section providing a tongue extending longitudinally from one of the ends, the second section providing a longitudinally oriented groove incorporated within one of the ends, positioned and sized for accepting the tongue therein, the groove including a longitudinally directed, flat, end-stop surface fixed in parallel with the external flat surface, and a longitudinally directed, flat, oblique surface positioned at an acute angle with the end-stop surface, the tongue providing end-stop and oblique, longitudinally directed flat surfaces positioned at said acute angle therebetween and sized and oriented for intimately mating with the end-stop and oblique surfaces of the groove respectively, the second section further including a lateral force producing means for applying a lateral force on the tongue, said force being directed offset to, and approximately in parallel with, the external flat surface, such that the respective oblique and end stop surfaces are caused to move into mutual contact thereby achieving coplaner alignment of the respective external flat surfaces of the respective sections.

2. The compound level of claim 1 further including at least one third leveling section, the third leveling section providing first and second ends and having an external flat surface for contact with the work surface, and at least one orientation sensing means arranged for indicating orientation of the work surface, and a further tongue extending from one of the first and second ends, and a further groove incorporated at the other of the opposing ends for engagement with any of the other leveling sections for forming a multisection level, each section being aligned with the other sections so that all of the flat surfaces thereon are in mutual coplanar contiguous alignment.

3. The compound level of claim 2, wherein said third leveling section is L-shaped.

4. The compound level of claim 2, wherein said third leveling section is T-shaped.

* * * * *